United States Patent Office 3,033,424
Patented May 8, 1962

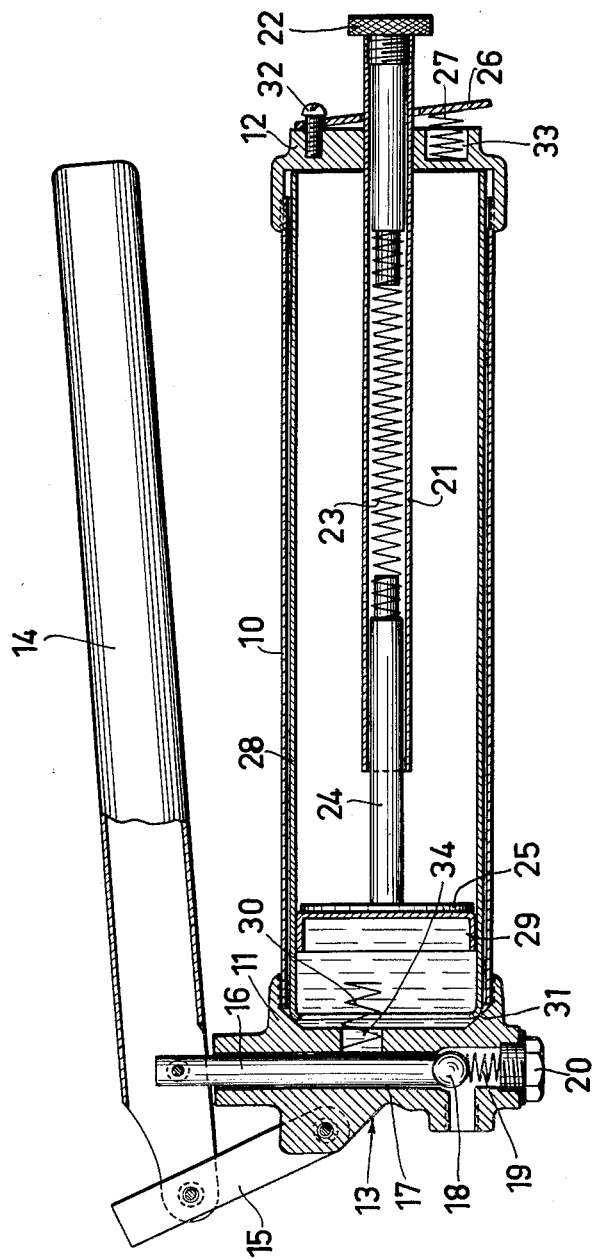

3,033,424
GREASE GUN
Uno Grönvik, 40 Grongatan, Ostersund, Sweden
Filed May 11, 1959, Ser. No. 812,257
Claims priority, application Sweden May 16, 1958
4 Claims. (Cl. 222—256)

The present invention relates to a grease gun, including a cylindrical tube with end walls, one of which contains a transversely mounted, lever-operated high pressure piston for pressing in grease at the desired point of lubrication, said grease being, via an axial aperture in said end wall, fed to the high pressure piston by a low pressure piston fixed to the end of a lockable piston rod which extends through the other end wall and is adapted to be actuated from the outside of said end wall. The invention is substantially characterized in that the piston rod consists of a rod part extending from the piston and projecting into a tube part slidably mounted in the other end wall, for pressure cooperation with a helical compression spring located between the rod end and the closed outer end of the tube part, the compression of the telescopic spring system thus obtained being limited by the tube part contacting the rear side of the piston.

The invention will be described below with reference to the accompanying drawing which discloses a grease gun in side sectional elevation.

The grease gun consists of a cylinder 10 with end walls 11 and 12. The end wall 11 is provided with a high pressure pump 13 which includes a lever 14 which, via a link 15, is secured to the end wall 11. The lever 14 communicates with a piston 16 provided in a cylinder 17 in the end wall. A ball 18 actuated by a spring 19 serves as valve. The ball and the spring are retained by a screw 20.

In the cylinder 10 there is arranged a low pressure pump, comprising a tube 21 closed at one end by a screw 22. A helical spring 23 and a rod 24 provided with a press plate 25 are arranged in the tube.

The tube 21 is extended through the end wall 12 which is screwed on to the cylinder 10. In order to fix the tube in the desired positions, a locking plate 26 is with its one end secured to the end wall 12 by means of a screw 32, while its free end rests against a helical spring 27, part of which is located in a recess 33 in the end wall 12.

It is shown in the drawing how a cartridge 28 containing grease is placed and how the press plate 25 actuates the displaceable bottom 29 of the cartridge.

In order to enable a simultaneous removal of the cartridge and its partly pushed-out bottom a helical spring 30 is placed in the end wall 11.

The end wall 11 is finally provided with a bevel 31 to obtain sealing between the grease cartridge 28 and the cylinder 10.

The grease gun described operates in the following manner: When the gun is to be charged, the end wall 12 is unscrewed and removed together with the low pressure pump. Then the cover of a grease cartridge is removed and the latter is inserted into the cylinder 10, the exposed grease facing the end wall 11.

Prior to screwing on the end wall 12, the locking plate 26 is pushed in and the screw 22 is completely unscrewed so that the tube 21 runs freely in the end wall 12 and the rod 24 runs freely in the tube 21. Thus the plate 25 can without resistance from the spring 23 be retracted to rest against the end wall 12. When said end wall 12 is in its place where it presses the circumference of the open cartridge end to seal against the bevel 31, the screw 22 is pressed in and screwed on, by which the spring 23 obtains a suitable bias. Thereafter the tube is pushed by means of the screw 22 resulting in a further compression of the spring 23 until the tube is stopped by the press plate 25 in which position it is automatically locked by the locking plate 26 when the screw 22 is released. The gun is now charged and ready for use.

According as grease is pressed out from the gun through the high pressure pump 13, new grease is fed on to same through the press plate 25 actuated by the spring 23 via the aperture 34 in the end wall 11. When required, the tube 21 can, after a certain consumption of the grease be pressed in again against the press plate and locked again. This may, for example, be necessary when the gun is used out of doors in very cold weather and consequently the grease used is very viscous.

When all grease has been emptied from the cartridge, the bottom 29 of the cartridge is partly pressed out from the cartridge itself and the spring 30 is compressed. Upon application of a pressure on the locking plate 26 the cartridge bottom is pressed back into the cartridge by the spring 30, whereafter the end wall 12 can be unscrewed and the cartridge together with the bottom be removed in a single operation and a new cartridge be inserted.

The eccentric arrangement of the spring 30 relatively to the press plate and thus also to the bottom of the cartridge facilitates the retraction of the bottom into the tube because owing to this the adhering contact of the bottom flange with the annular bevel 31 is successively broken and the vacuum eliminated by the tilting of the bottom.

Various modifications are possible within the frame of the invention by replacing various details by equivalent mechanical elements. As regards the design of the cartridge itself, its displaceable bottom may also have its annular flange directed in a direction opposite to that shown, i.e. backwards in relation to its direction of displacement. By this also the risk of wedging would be less when a cartridge is consumed and thus also the additional retracting spring could be dispensed with, especially as the deformation of the bottom edge against the bevel 31 is more or less elastic.

As is seen from the foregoing description the grease gun according to the invention is of very stable, hard-wearing and simple construction with easily replaceable parts. A special advantage of the gun is furthermore that also a partly consumed cartridge can be easily exchanged and, if necessary, be taken out, e.g. for heating.

What I claim is:
1. A grease gun, including a cylindrical barrel with end walls, the first said end wall containing a transverse hollow cylinder of small diameter, a transversely mounted, lever-operated high pressure piston operating in said transverse hollow cylinder for pressing in grease at the desired point of lubrication, an axial aperture in said first end wall connecting the interior of said cylindrical barrel with said transverse cylinder so grease may be fed to the high pressure piston, a piston stem extending through the second said end wall of said cylindrical barrel adapted to be actuated from the outside of said second end wall, a low pressure piston fixed to the inner end of said piston stem, said piston stem comprising two parts, one part being a rod extending from the piston and the other part being a tube receiving the end of said rod and slidably but lockably mounted in said second end wall, an abutment provided within the tube at the outer end thereof, a helical compression spring inserted in said tube between the end of said rod extending into said tube and said abutment, said spring tending to urge said two parts in opposite directions, the compression of the spring being limited by the inner end of the tube contacting the rear side of the piston.

2. A grease gun as claimed in claim 1, in which said abutment comprises a plug member adjustably secured in the outer end of the tube and defining pushing means for effecting the displacement of said tube, the end of said plug member within said tube engaging the outer end of the spring.

3. A grease gun as claimed in claim 1, including a replaceable cartridge having an open top and having a displaceable bottom part for insertion in said barrel, the low pressure piston being formed by a press member directly contacting said displaceable bottom part of said cartridge, said cartridge having its open end communicating with the axial aperture in the end wall containing the high pressure piston, said bottom part of said cartridge being flanged, and said press member being a flat plate of less diameter than the barrel.

4. A grease gun as claimed in claim 3, in which a spring is located at said first end wall and is adapted to be compressed by said bottom part as it approaches the discharge end of the cartridge for automatically returning said bottom part into the cartridge after the latter has been emptied and the tube press member has been retracted.

References Cited in the file of this patent

UNITED STATES PATENTS

| | | |
|---|---|---|
| 1,981,508 | Harris | Nov. 20, 1934 |
| 2,106,023 | Tear | Jan. 18, 1938 |
| 2,567,960 | Myers et al. | Sept. 18, 1951 |
| 2,758,758 | Schimpf | Aug. 14, 1956 |
| 2,886,215 | Klein et al. | May 12, 1959 |